(12) United States Patent
Mitsuda et al.

(10) Patent No.: US 7,616,429 B2
(45) Date of Patent: Nov. 10, 2009

(54) ELECTRIC DOUBLE LAYER CAPACITOR

(75) Inventors: Kenro Mitsuda, Tokyo (JP); Ikuro Suga, Tokyo (JP); Sadayuki Matsumoto, Tokyo (JP); Makoto Seto, Tokyo (JP); Naoki Ochi, Tokyo (JP); Yoshiyuki Takuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 429 days.

(21) Appl. No.: 11/680,147

(22) Filed: Feb. 28, 2007

(65) Prior Publication Data

US 2007/0215926 A1 Sep. 20, 2007

(30) Foreign Application Priority Data

| Mar. 7, 2006 | (JP) | ............................ 2006-060904 |
| Jul. 21, 2006 | (JP) | ............................ 2006-199223 |
| Feb. 6, 2007 | (JP) | ............................ 2007-026820 |

(51) Int. Cl.
*H01G 9/00* (2006.01)

(52) U.S. Cl. ...................... 361/502; 361/503; 361/504; 361/508; 361/512; 361/516

(58) Field of Classification Search ................. 361/502, 361/503–504, 508–512, 516–519, 303–305, 361/523–529; 429/34, 46, 128–129
See application file for complete search history.

(56) References Cited

U.S. PATENT DOCUMENTS

| 5,953,204 A * | 9/1999 | Suhara et al. ............... 361/502 |
| 6,201,685 B1 * | 3/2001 | Jerabek et al. .............. 361/502 |
| 6,233,135 B1 * | 5/2001 | Farahmandi et al. ........ 361/502 |
| 6,404,619 B1 * | 6/2002 | Marshall et al. ............. 361/526 |
| 6,442,015 B1 * | 8/2002 | Niiori et al. ................. 361/502 |
| 6,723,471 B2 * | 4/2004 | Kitagawa et al. ......... 429/231.8 |

FOREIGN PATENT DOCUMENTS

| JP | 2-116110 | 4/1990 |
| JP | 6-351159 | 12/1994 |
| JP | 2003-31449 | 1/2003 |
| JP | 2003-124078 | 4/2003 |
| JP | 2005-175412 | 6/2005 |

* cited by examiner

*Primary Examiner*—Nguyen T Ha
(74) *Attorney, Agent, or Firm*—Oblon, Spivak, McClelland, Maier & Neustadt, L.L.P.

(57) ABSTRACT

Provided is an electric double layer capacitor including a large capacity single cell having a large electrostatic capacity and a small capacity single cell are connected to the same exterior case in parallel, and a thickness of a separator of the large capacity single cell is made thicker than a thickness of a separator of the small capacity single cell. With this structure, a supply amount of an electrolyte solution to the large capacity single cell is markedly increased compared with the small capacity single cell, thereby being capable of preventing degradation of the large capacity single cells and the small capacity single cells and providing the electric double layer capacitor having an excellent cycle life and having a large power storage amount while keeping characteristics capable of instantaneously allowing large current to flow.

12 Claims, 11 Drawing Sheets

3a  7  3b  9b  4b  8  4a 3a  7  3b  9b  4b  8  4a

ELECTRIC DOUBLE LAYER CAPACITOR

BACKGROUND OF THE INVENTION

1. Field of the Invention

The present invention relates to an electric double layer capacitor, and more particularly, to an electric double layer capacitor in which electric charge is accumulated within an electric double layer formed on an interface between an electrolytic solution and a polarized electrode.

2. Description of the Related Art

An electric double layer capacitor has various forms such as a layered type, a cylindrical type, and a button type. However, basically, the electric double layer capacitor is provided with a plurality of single cells (hereinafter, a constructional component having a positive electrode layer and a negative electrode layer, which are formed so as to face with each other through a separator, is referred to as "single cell") formed of positive electrode layers and negative electrode layers each containing as main components carbon particles such as activated carbon formed on a surface of the electric current collector, and a separator for electrically insulating the positive electrode layers and the negative electrode layers from each other while conducting ions, in which the plurality of cell layers are laminated and received in an exterior case impregnated with an electrolytic solution.

Further, the electric double layer capacitor uses an electrostatic capacity of electric double layers, which are formed on surfaces of insides of micropores of the carbon particles of polarized electrodes (refers to "positive electrode layer and negative electrode layer") within the electrolytic solution.

The positive electrode refers to a structure in which the positive electrode layer is formed on the surface of the electric current collector, and the negative electrode refers to a structure in which the negative electrode layer is formed on the surface of the electric current collector.

Note that, the electrode layer refers to the positive electrode layer and negative electrode layer, collectively.

The electric double layer capacitor has a feature of having a large energy storage capacity in comparison with general capacitors such as an aluminum electrolytic capacitor, a ceramic capacitor, and a film capacitor.

The electric double layer capacitor also has a feature of having a high power density in comparison with batteries such as a lead battery, a nickel hydrogen battery, and a lithium ion battery.

The electric double layer capacitor is becoming widely used in applications such as an instantaneous voltage drop compensator, a backup for electronic equipment, a power assist for consumer electronic equipment and copying machines, a power supply for a start-up of an automobile after an idle stop, a power supply for a hybrid automobile, and a power buffer for relaxing and leveling variations of photovoltaic power generation and wind power generation. Accordingly, the electric double layer capacitor is expected as an energy storage device, which is useful for spreading and promoting energy conservation and a new energy.

Further, because no chemical reaction occurs in charging and discharging, the electric double layer capacitor has advantages in that a large amount of current is allowed to flow instantaneously, and that charge and discharge efficiency is high. In addition, the electric double layer capacitor has other advantages in that 100,000 times or more of charging and discharging are possible, and that the life-time thereof is ten years or more and the reliability is high.

However, the energy storage capacity of the electric double layer capacitor is low in comparison with a lead battery, a nickel hydrogen battery, a lithium ion battery, or the like. Accordingly, how the energy storage capacity of the electric double layer capacitor can be enhanced is the largest problem to be solved in order to promote the use of the electric double layer capacitor.

Therefore, in order to expand the amount of energy which can be stored in the electric double layer capacitor, there is generally employed a method of expanding an energy storage capacity by: providing positive electrode layers and negative electrode layers having a thickness of about 0.1 mm on both sides of an electric current collector; arranging a plurality of single cells via a separator interposed therebetween and connecting them in parallel; and by increasing a number of the single cells to be received in a single electric double layer capacitor (refer to JP 2003-124078 A, for example).

Further, by increasing the thickness of the electrode layer and using the electrode layer having the thickness of 0.4 mm or 1 mm, for example, the energy storage capacity can be increased. However, the electrostatic capacity and an internal electric resistance become large, resulting in the large current not being allowed to flow instantaneously. In other words, there arises a problem in that the largest advantage of the electric double layer capacitor is eliminated, because the power density thereof decreases.

The larger the electrostatic capacity becomes, the more energy storage capacity can be obtained. However, the necessary discharge time increases, resulting in decreasing of the power density.

Further, as the internal resistance increases, thermal loss that generates during the current flow increases, so it becomes impossible to allow the large current to flow, resulting in decreasing of the power density.

So, in order to suppress the decrease in the power density while keeping the energy storage capacity, there is proposed a circuit structure in which the electric double layer capacitor having a large electrostatic capacity and a large internal resistance and the electric double layer capacitor having a small electrostatic capacity and a small internal resistance are connected in parallel via an external circuit (refer to JP 06-351159 A, for example).

An electrostatic capacity is represented by farad (F) and an internal resistance is represented by ohm ($\Omega$), and the product therebetween is called a normalized internal resistance ($\Omega$F) and corresponds to time constant.

Then, the electric double layer capacitor having the smaller normalized internal resistance is superior in instantaneous power, but is small in retaining force, whereas the electric double layer capacitor having the larger normalized internal resistance is superior in retaining force, but is small in instantaneous power.

In claims and embodiments of JP 06-351159 A, there is disclosed an embodiment of connecting the electric double layer capacitor having a small normalized internal resistance and the electric double layer capacitor having a large normalized internal resistance via an external circuit.

In the internal resistance, ion diffusion resistance which generates at the time of loading and discharging an electrolyte solution to/from pores of the carbon particles is dominant, and the contribution of the electrode thickness and the separator thickness to the internal resistance is relatively small.

Accordingly, in order to increase the power density by lowering the time constant or the normalized internal resistance ($\Omega$F), it is effective to lower the electrostatic capacity.

However, lowering the electrostatic capacity causes lowering of the energy storage capacity, the relation being a dilemma.

Further, as another conventional art, there is disclosed an electric double layer capacitor having a structure, in which a single cell constructed of a thick electrode layer having a large electrostatic capacity and a single cell constructed of a thin electrode layer having a small internal resistance are connected in parallel and received in the same exterior case (refer to JP 08-45793 A, for example).

In the above structure, if the constructional material is the same, the electrostatic capacity can be made larger by thickening the electrode layer. Accordingly, if the internal resistance is the same extent, a single cell having a small normalized internal resistance and a single cell having a large normalized internal resistance may be received in the same exterior case to obtain an electric double layer capacitor.

However, as described in JP 06-351159 A, in the case where an electric double layer capacitor having a large internal resistance and a large electrostatic capacity and an electric double layer capacitor having a small internal resistance and a small electrostatic capacity are connected in parallel via an exterior circuit, a current flows repeatedly between the electric double layer capacitors via electric terminals and wirings connected thereto. Accordingly, current flowing the electric terminals and wirings generates heat to consume much of accumulated energy, thereby causing a problem in that the energy which can be taken out to an outside is markedly reduced.

In addition, as described in JP 08-45793 A, in the case where the electric double layer capacitor in which the single cell constructed of the thick electrode layer having a large electrostatic capacity and the single cell constructed of the thin electrode layer having a small internal resistance are connected in parallel, current flowing the electric terminals, wirings, and the exterior circuits decreases, thereby being capable of preventing the electrostatic capacity, which can be taken out to the exterior from being decreased.

However, there was a serious problem in that the cycle life of the electric double layer capacitor is markedly deteriorated when charging and discharging are repeatedly performed in comparison with the electric double layer capacitor formed of the single cell only, which is constructed of a thick electrode layer having a large electrostatic capacity and with the electric double layer capacitor formed of the single cell only, which is constructed of a thin electrode layer having a small internal resistance.

SUMMARY OF THE INVENTION

The present invention has been made to solve the above-mentioned problems, and it is an object of the present invention to provide an electric double layer capacitor of low cost, which has an excellent cycle life and having a large power storage amount while keeping characteristics capable of instantaneously allowing large current to flow.

The present invention relates to an electric double layer capacitor, comprising a plurality of single cells including a positive electrode layer formed on a positive electrode current collector and a negative electrode layer formed on a negative electrode current collector, which are arranged so as to face each other with a porous separator provided therebetween, the plurality of the single cells being layered and disposed in an exterior case impregnated with an electrolytic solution, and being connected in parallel, wherein: the positive electrode layers are classified into a large capacity positive electrode layer and a small capacity positive electrode layer whose electrostatic capacities are different from each other; the negative electrode layers are classified into a large capacity negative electrode layer and a small capacity negative electrode layer whose electrostatic capacities are different from each other; at least one of the single cells is a combination of the large capacity positive electrode layer and the large capacity negative electrode layer; at least another one of the single cells is a combination of the small capacity positive electrode layer and the small capacity negative electrode layer; a thickness of the separator disposed between the large capacity positive electrode layer and the large capacity negative electrode layer is thicker than the thickness of the separator disposed between the small capacity positive electrode layer and the small capacity negative electrode layer.

Consequently, it is possible to provide the electric double layer capacitor having an excellent cycle life and having a large power storage amount while keeping characteristics capable of instantaneously allowing large current to flow.

DETAILED DESCRIPTION OF THE PREFERRED EMBODIMENTS

First Embodiment

Figure 1:
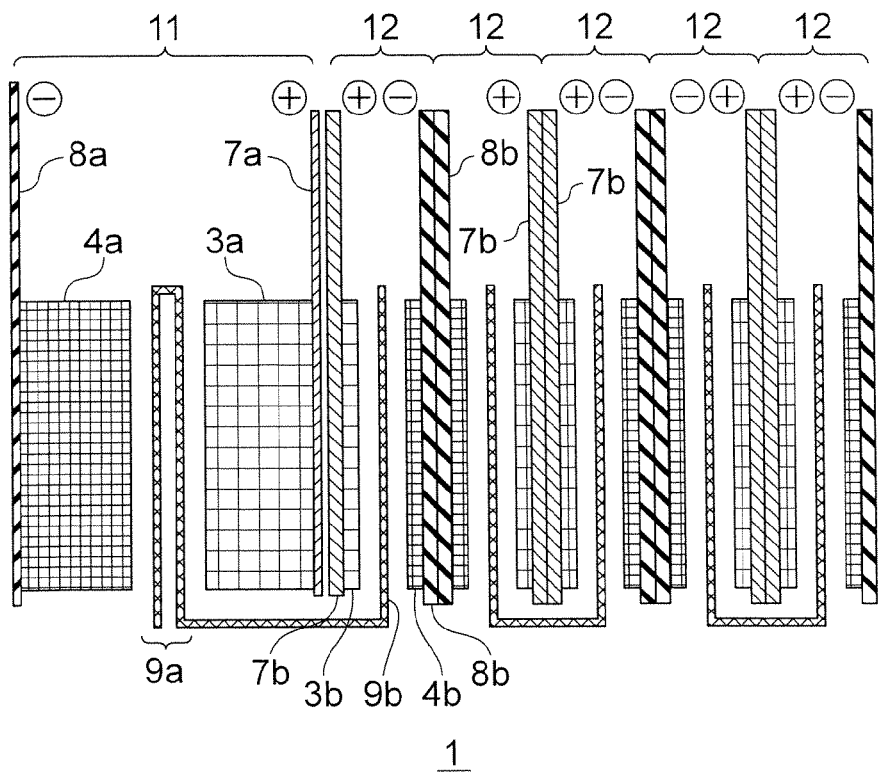
FIG. 1 is a sectional view showing a structure of an electric double layer capacitor according to a first embodiment of the present invention.

FIG. 1 is a sectional view showing a structure of an electric double layer capacitor according to a first embodiment of the present invention.

The electric double layer capacitor 1 according to the first embodiment of the present invention, as shown in FIG. 1, is constructed of: one single cell (hereinafter, referred to as "large capacity single cell") 11, in which a positive electrode layer 3a having a thick electrode layer and a large electrostatic capacity (hereinafter, referred to as "large capacity positive electrode layer") 3a and a negative electrode layer 4a having a thick electrode layer and a large electrostatic capacity (hereinafter, referred to as "large capacity negative electrode layer") 4a are arranged; and five singe cells (hereinafter, referred to as "small capacity single cell") 12, in each of which a positive electrode layer 3b having a thin electrode layer and a small electrostatic capacity (hereinafter, referred to as "small capacity positive electrode layer") and a negative electrode layer 4b having a thin electrode layer and a small electrostatic capacity (hereinafter, referred to as "small capacity negative electrode layer") are arranged.

The large capacity positive electrode layer 3a of the large capacity single cell 11 is formed on a positive electrode current collector 7a, which is formed of an aluminum foil of 30 µm in thickness, and is 1.0 mm in thickness. The large capacity negative electrode layer 4a of the large capacity single cell 11 is formed on a negative electrode current collector 8a, which is formed of an aluminum foil of 30 µm in thickness, and is 1.0 mm in thickness.

A separator 9a of the large capacity single cell 11 is formed by superposing two separators on each other, each of which being 30 µm in thickness. The separator 9a is called "thick separator 9a", hereinafter.

The large capacity positive electrode layer 3a and the large capacity negative electrode layer 4a are arranged so as to face to each other with interposing the thick separator 9a therebetween.

Each of the large capacity positive electrode layer 3a and the large capacity negative electrode layer 4a has a front surface having an outer size of 10 cm by 10 cm and an area of 100 cm².

On the other hand, the small capacity positive electrode layer 3b of the small capacity single cell 12 is formed on a positive electrode current collector 7b, which is formed of an aluminum foil of 50 µm in thickness, and is 0.1 mm in thickness.

Further, the small capacity negative electrode layer 4b of the small capacity single cell 12 is formed on a negative electrode current collector 8b, which is formed of an aluminum foil of 50 µm in thickness, and is 0.1 mm in thickness.

Then, a separator 9b of the small capacity single cell 12 is a separator of 30 µm in thickness, which is called "thin separator" 9b, hereinafter.

The small capacity positive electrode layer 3b and small capacity negative electrode layer 4b are arranged so as to face to each other with interposing the thin separator 9b therebetween. Each of the small capacity positive electrode layer 3b and the small capacity negative electrode layer 4b has a front surface having an outer size of 10 cm by 10 cm and an area of 100 cm².

Each of the positive electrode layers 3a and 3b and the negative electrode layers 4a and 4b is a layer, which is obtained by binding vapor activated carbon having particles of approximately 10 µm in average diameter by using a binder of a fluorinated resin such as polytetrafluoroethylene (PTFE).

Note that, instead of vapor activated carbon, alkaline activated carbon, nano-gate carbon, graphite, or grain of amorphous carbon may be used.

Further, instead of a PTFE, a fluorinated resin such as PVDF, synthetic rubber such as styrene-butadiene rubber (SBR), acrylic rubber, and olefin binders may be used. The layer is formed by a rolling method, a coating method, or a mold forming method.

The separator 9a and 9b are each a fibrillated form or a porous film such as polypropylene or polytetrafuloroethylene (PTFE) as well as a cellulose-based film such as a natural pulp, natural cellulose, or a solvent-spinning cellulose, a glass fiber, or nonwoven fabric.

Figure 2:
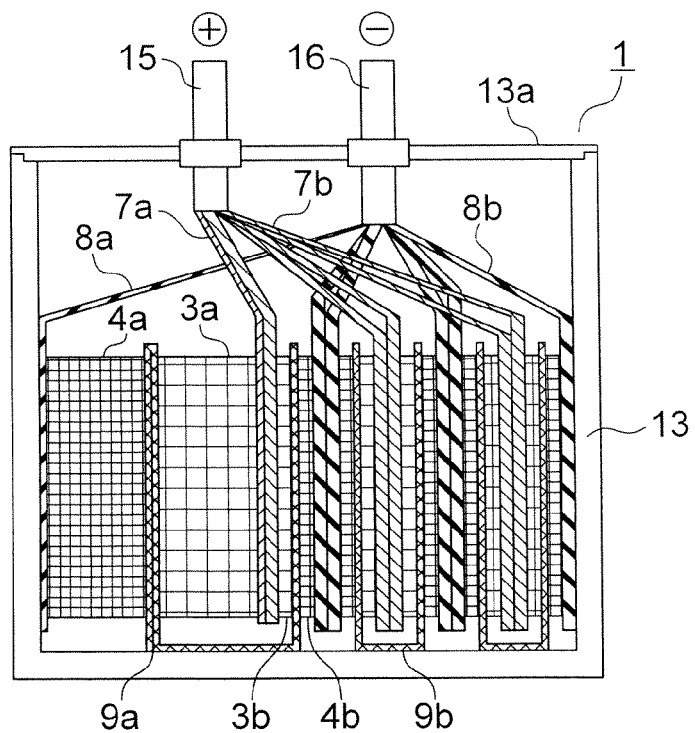
FIG. 2 is a longitudinal sectional view showing a state where the electric double layer capacitor according to the first embodiment of the present invention is received in an exterior case.

FIG. 2 is a longitudinal sectional view showing a state where the electric double layer capacitor according to the first embodiment of the present invention is received in an exterior case 13.

The one large capacity single cell 11 and the five small capacity single cells 12 are layered and received within the exterior case 13 so that the large capacity single cell 11 is placed at one side in the layering direction.

Further, the negative electrode current collector 8a of the large capacity single cell 11 and the negative electrode current collector 8b of the small capacity single cell 12 placed at the most outside in the layering direction are brought into contact with the exterior case 13.

The large capacity single cell 11 and the small capacity single cell 12 are layered so that: the positive electrode current collector 7a of the large capacity single cell 11 is brought into contact with the positive electrode current collector 7b of the small capacity single cell 12 being adjacent to the large capacity single cell 11; the negative electrode current collectors 8b of the small capacity single cells 12 placed inside are respectively brought into contact with the negative electrode current collectors 8b of the small capacity single cells 12 being adjacent; and the positive electrode current collectors 7b of the small capacity single cells 12 placed inside are respectively brought into contact with the positive electrode current collectors 7b of the small capacity single cells 12 being adjacent.

The positive electrode current collectors 7a and 7b of the large capacity single cell 11 and the small capacity single cells 12 are connected to a positive electrode terminal 15 by ultrasonic connecting or the like. The positive electrode terminal 15 is insulated from the exterior case 13, and is led out of the exterior case 13.

The negative electrode current collectors 8a and 8b of the large capacity single cell 11 and the small capacity single cells 12 are connected to a negative electrode terminal 16 by the ultrasonic connecting, or the like. The negative electrode terminal 16 is insulated and extended out of the exterior case 13.

An electrolytic solution is impregnated within the exterior case 13, and the exterior case 13 is sealed with a cover 13a. Note that, in the case where a total thickness of the electric double layer capacitor is 50 mm or less, leading out the current terminals from ends of the exterior case 13 and sealing the electric double layer capacitor without the cover 13a is a general way.

The electrolytic solution is a solution prepared by dissolving an electrolyte in a solvent. An electrolyte contains a cation and an anion in combination. Examples of the cation include a quaternary ammonium, 1,3-dialkylimidazolium, and 1,2,3-trialkylimidazolium. Examples of the anion include a salt having $BF_4^-$, $PF_6^-$, $ClO_4^-$, or $CF_3SO_3^-$, and a salt having $AlCl_4^-$ or $BF_4^-$ in 1-ethyl-3-methylimidazolium (EMI) or 1,2-dimethyl-3-propylimidazolium (DMPI). Further, in recent years, a spiro-type electrolyte has been widely used.

As a solvent there is used one kind or a mixed solvent of two or more kinds selected from the group consisting of propylene carbonate, ethylene carbonate, dimethyl carbonate, diethyl carbonate, dimethoxymethane, diethoxyethane, γ-butyllactone, acetonitrile, propionitrile, and sulforan.

Further, in recent years, there is also a case where an ionic solution in which an electrolyte itself is liquefied, is used. The present invention is applicable all the cases.

Figure 3A:
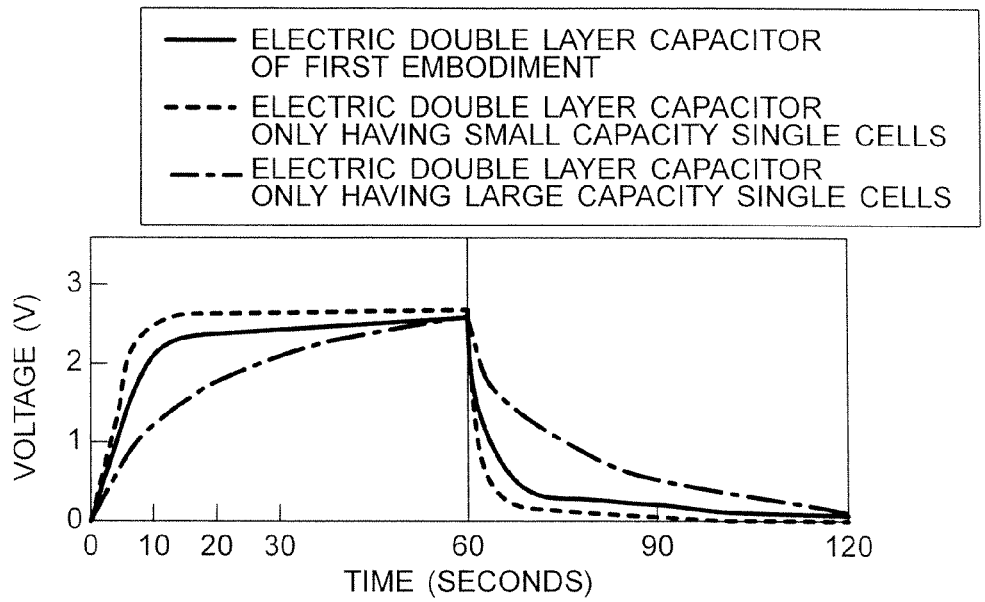
FIGS. 3A and 3B are graphs each showing charging and discharging characteristics of the electric double layer capacitor according to the first embodiment of the present invention.
Figure 3B:
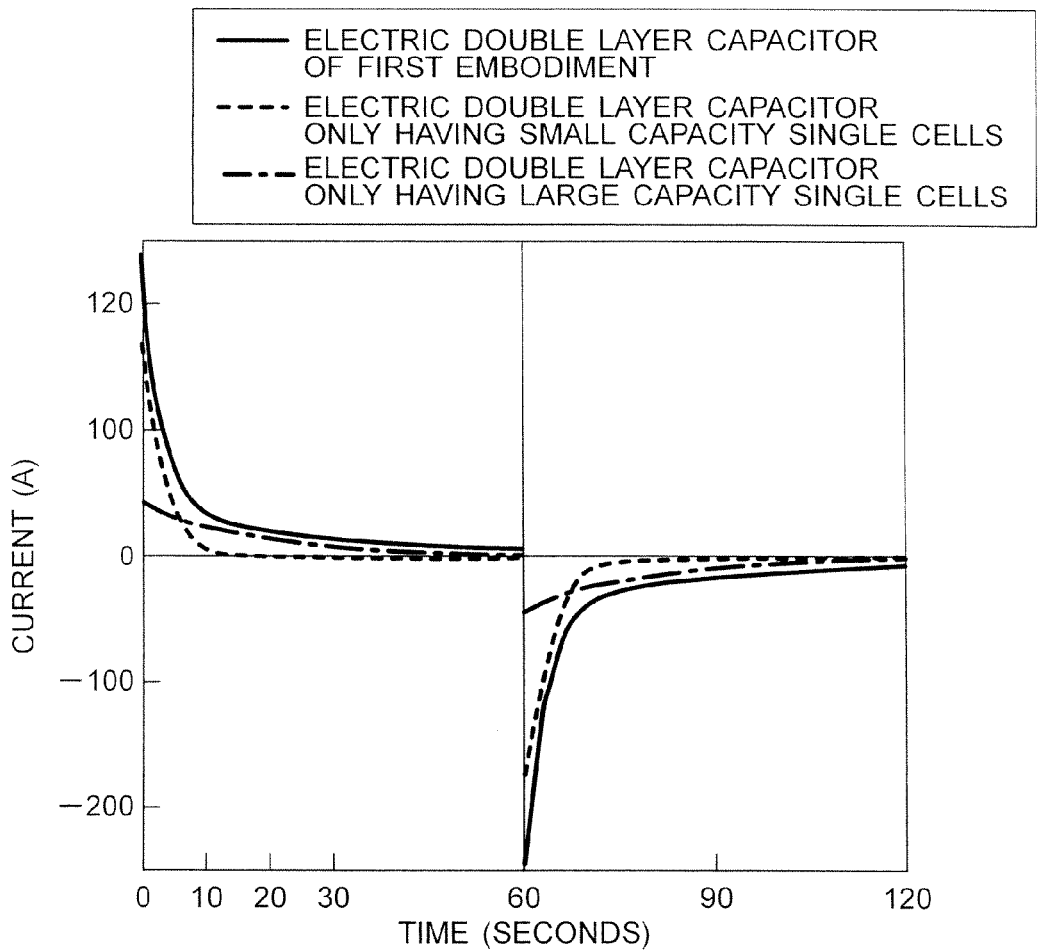

FIGS. 3A and 3B are graphs each showing charging and discharging characteristics of the electric double layer capacitor according to the first embodiment of the present invention.

Three kinds of electric double layer capacitors are fabricated and charging and discharging characteristics of those are measured.

A first electric double layer capacitor receives within the exterior case 13 the one large capacity single cell 11.

A second electric double layer capacitor receives within the exterior case 13 the five small capacity single cells 12.

A third electric double layer capacitor, as shown in FIG. 2, receives within the exterior case 13 the one large capacity single cell 11 and five small capacity single cells 12.

A fourth electric double layer capacitor has a structure in which the thick separator 9a is changed into the thin separator 9b in the electric double layer capacitor of FIG. 2. That is, the fourth electric double layer capacitor is different from the third electric double layer capacitor in that point only the separator is changed from the double layer into single layer. Almost the same charging and discharging characteristics of the fourth electric double layer capacitor with that of the third electric double layer capacitor can be obtained.

In the second electric double layer capacitor, as shown in FIGS. 3A and 3B, the current rises in a short period of time immediately after start of charging. It is understood that the inrush current of the initial charging flows through the small capacity positive electrode layer 3b and small capacity negative electrode layer 4b, and is charged in the small capacity single cell 12.

Then, the voltage reaches the maximum supplying voltage after about 10 seconds from the start of charging, and the charging in the small capacity single cell 12 finishes.

On the other hand, in the first electric double layer capacitor, because the current flowing immediately after start of charging is smaller than that of the second electric double layer capacitor, the large current can not flow instantaneously through the large capacity positive electrode layer 3a and large capacity negative electrode layer 4a, so it is not possible to charge in the large capacity single cell 11 quickly.

However, the voltage does not reach the maximum supplying voltage after a lapse of 60 seconds from the start of charging, so it is possible to charge in the large capacity single cell 11 for a long period of time.

In the third electric double layer capacitor which is the same as connecting the first electric double layer capacitor and the second electric double layer capacitor in parallel, the large inrush current flows immediately after start of charging, but the voltage does not reach the maximum supplying voltage, after that, it is possible to charge for a long period of time, so a large amount of electric power can be accumulated in the third electric double layer capacitor.

In the second electric double layer capacitor, the current rises in a short period of time immediately after start of discharging. It is understood that the large current flows instantaneously through the small capacity positive electrode layer 3b and the small capacity negative electrode layer 4b, and is discharged from the small capacity single cell 12.

Then, the voltage reaches zero after about 10 seconds from the start of discharging, and the discharging from the small capacity single cell 12 finishes.

On the other hand, in the first electric double layer capacitor, the current flowing immediately after start of discharging is smaller than that of the second electric double layer capacitor, and the instantaneous large current can not flow through the large capacity positive electrode layer 3a and the large capacity negative electrode layer 4a, so it is not possible to perform discharging quickly.

However, the voltage does not reach zero after a lapse of 60 seconds from the start of discharging, so it is possible to discharge for a long period of time.

In the third electric double layer capacitor which has the same structure as connecting the first electric double layer capacitor and the second electric double layer capacitor in parallel, the large current flows immediately after start of discharging, but the voltage does not reach zero, so it is possible to discharge for a long period of time, and it is understood that a large amount of electric power can be supplied from the third electric double layer capacitor.

The instantaneously large current flowing occurs in most of equipment having an inductance load such as motors.

In order to deal with this state, it has been conducted to allow the instantaneously large current flowing by providing the small capacity single cell 12, which is constructed of the small capacity positive electrode layer 3b and small capacity negative electrode layer 4b, and to ensure the total amount of electric power by increasing the number of layers of the small capacity single cells 12.

However, the current quickly decreases except for immediately after start of discharging, so by only providing the small capacity single cells 12, the possible maximum current is larger several times than the required maximum current and such a capacitor may have a extremely large size.

Therefore, as in the electric double layer capacitor 1 according to the first embodiment of the present invention, by combining the large capacity single cell 11 and the small capacity single cells 12, it is possible to provide the large current instantaneously required, and to increase the total amount of electric power accumulated.

Further, it is possible to attain the cost reduction by reducing the total number of cells.

In other words, this electric double layer capacitor 1, the thickness of the large capacity positive electrode layer 3a and the large capacity negative electrode layer 4a is ten times the thickness of the small capacity positive electrode layer 3b and the small capacity negative electrode layer 4b, so the electrostatic capacity of the large capacity single cell 11 becomes ten times of that of the small capacity single cell 12, and the amount of electric power accumulated therein become ten times.

To confirm the effect of the thick separator 9a, which is used for a large capacity single cell 11, two each of the third electric double layer capacitors (the thicker separator 9a is used in the large capacity single cell 11) and the fourth electric double layer capacitors (the thin separator 9b is used in the large capacity single cell 11) are loaded in an incubator at a temperature of 25° C., and the initial electrostatic capacity thereof is measured.

Next, those capacitors are loaded in the incubator at a temperature of 40° C. and charged up to 2.7 V by a charge and discharge device. After that, a charge and discharge cycle including 10 seconds charging and 10 seconds discharging is performed continuously 100,000 times, and then measured the electrostatic capacities thereof.

As a result, it is found that, in the third electric double layer capacitor, the remaining electrostatic capacities are each 85% and 83% of the initial ones, which means the performances are being maintained, whereas, in the fourth electric double layer capacitor, the performances are largely degraded as 58% and 45% of the initial electrostatic capacities.

As the result of investigations after disassembling of those capacitors, it is revealed the thin separators 9b used in the large capacity cell 11 of the fourth electric double layer capacitor are partly discolored into brown, and there occurs the shortage of the electrolyte solution for the separator 9b, resulting in degradation of the performance of the fourth electric double layer capacitor.

In the case of the third electric double layer capacitor, the thickness of the thick separator 9a of the large capacity single cell 11 is two times of that of the thin separator 9b of the small capacity single cell 12. Accordingly, the shortage of the electrolyte solution, which occurs in the large capacity electrode layer at the time of charging and discharging is sufficiently replenished. On the contrary, in the case of the fourth electric double layer capacitor, the thickness of the separator 9b of the large capacity single cell 11 is the same as that of the thin separator 9b of the small capacity single cell 12. As a result, the replenish of the electrolyte solution cannot be made in response to the charge and discharge current, and the degradation of the electrolyte solution or the electrode layer was caused in the large capacity single cell 11 due to the shortage of the electrolyte solution.

The discoloring into brown, which is occurred on the thin separator 9b used in the large capacity single cell 11, is a clear sign indicating the degradation of the electrolyte solution or the electrode layer.

An anion of the electrolyte and a cation of the electrolyte are drawn into the pores of the positive electrode layer and the pores of the negative electrode layers, respectively, together with the solvent at the time of charging, whereas, released therefrom at the time of discharging.

The shortage of the electrolyte solution is replenished from the separator side. However, if the charging and discharging is repeatedly performed for a long period of time, the supply of the electrolyte solution seems to be delayed in the large capacity electrode layer.

Consequently, the thickness of the thick separator 9a of the large capacity single cell 11 is made thicker than that of the thin separator 9b of the small capacity single cell 12, thereby being capable of suppressing the degradation in the cycle life.

Note that, the thickness of the thin separator 9b of the small capacity single cell 12 is one half the thickness of the thick separator 9a of the large capacity single cell 11, so the ion conductivity of the thin separator 9b becomes twice of that of the thick separator 9a, and there is such an effect that the maximum current allowed to flow therethrough increases.

In order to make thicker the separator, there can be used an originally thicker separator instead of employing a method of superposing a plurality of separators. In addition, by enlarging average pore diameters, it is possible to enhance the effect of replenishing the shortage of the electrolyte solution, which occurs when the charging and discharging is repeatedly performed, by supply rate of the electrolyte solution is increased.

Further, the thickness of the positive electrode current collector 7b and the negative electrode current collector 8b of the small capacity single cell 12 is three fifths of the thickness of the positive electrode current collector 7a and the negative electrode current collector 8a of the large capacity single cell 11, so the voltage drop in the positive electrode current collector 7b and the negative electrode current collector 8b is smaller than the voltage drop in the positive electrode current collector 7a and the negative electrode current collector 8a, and there is such an effect that the maximum current allowed to flow therethrough increases.

As described above, the first embodiment of the present invention provides the electric double layer capacitor including the large capacity single cell having a large electrostatic capacity and the small capacity single cell having a small electrostatic capacity, which are connected in parallel within the same exterior case, in which the thickness of the separator of the large capacity single cell is made thicker than that of the separator of the small capacity single cell, whereby being capable of markedly increasing the supply rate of the electrolyte solution to the large capacity single cell than that of the small capacity single cell. In addition, by increasing the electrolyte solution supply rate to the large capacity single cell, it is possible to prevent the degradation of the large capacity single cell or the small capacity single cell due to the shortage of the replenishment of the electrolyte solution to the large capacity single cell, which gradually advances when the charging and discharging is performed repeatedly. With this, it is possible to provide the electric double layer capacitor with a large energy capacity at low cost, while keeping characteristics of being excellent in cycle life and being capable of allowing a large current to flow instantaneously.

Second Embodiment

Figure 4A:
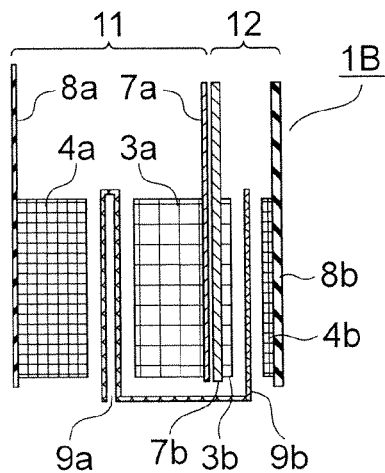
FIGS. 4A to 4C are sectional views each showing a structure of an electric double layer capacitor according to a second embodiment of the present invention.
Figure 4B:
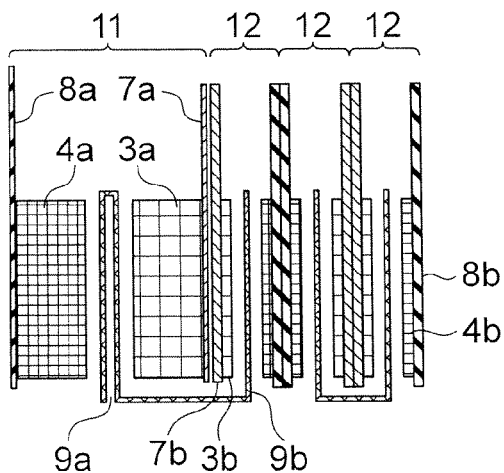
Figure 4C:
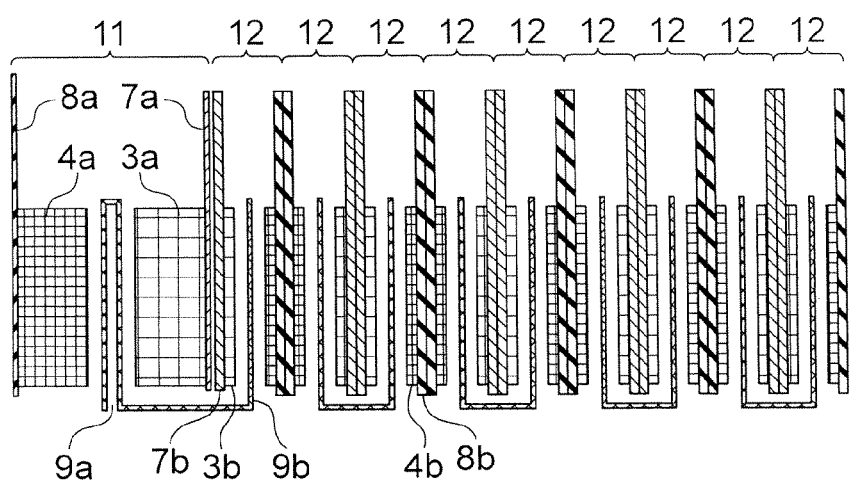

Each of FIGS. 4A to 4C is a sectional view showing a structure of single cells of an electric double layer capacitor according to a second embodiment of the present invention.

An electric double layer capacitor 1B according to a second embodiment of the present invention is different from the electric double layer capacitor 1 according to the first embodiment of the present invention in that the number of the large capacity single cell 11 and the small capacity single cells 12 are limited. However, the other structure is the similar to the first embodiment of the present invention, therefore, the description thereof is omitted while assigning the same reference symbols to the similar parts.

The electric double layer capacitor 1B according to the second embodiment of the present invention fixes the number of the large capacity single cell 11 at one, and limits the number of the small capacity single cells 12 to zero (not shown), one (shown in FIG. 4A), three (shown in FIG. 4B), five (shown in FIG. 1), or nine (shown in FIG. 4C).

Figure 5:
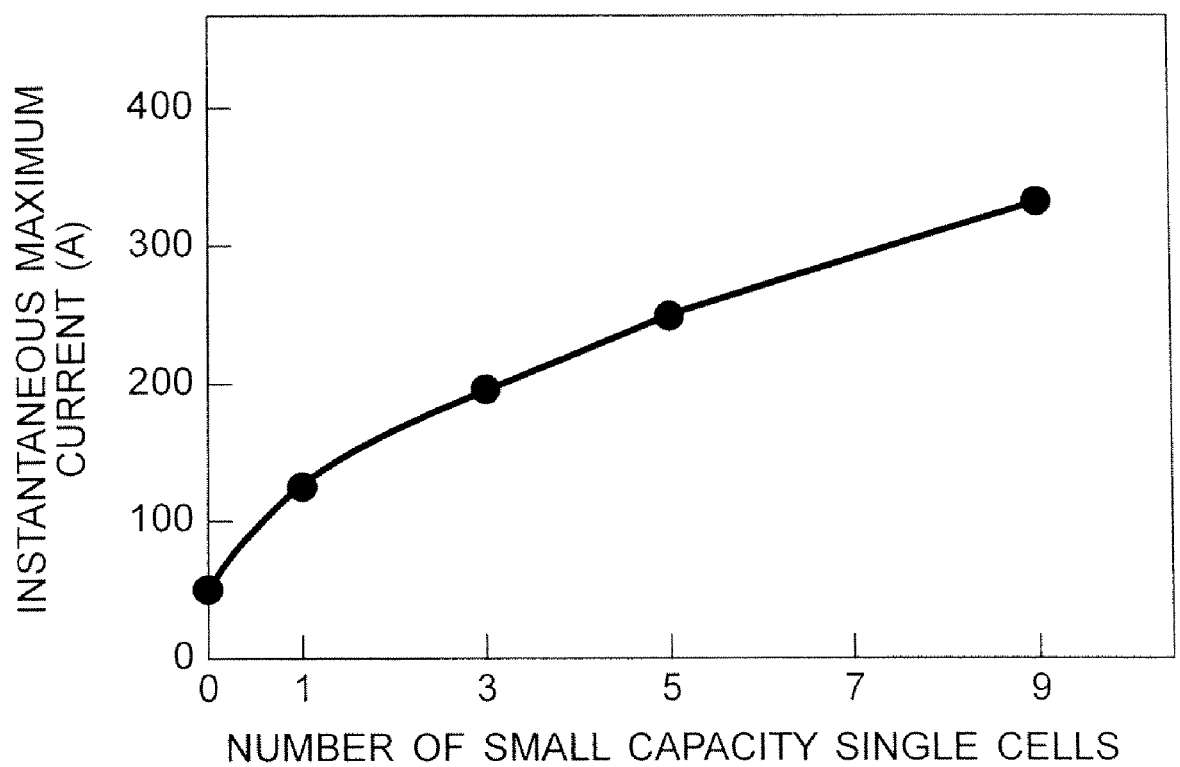
FIG. 5 is a graph showing dependency of a maximum current allowed to flow instantaneously into the electric double layer capacitor according to the second embodiment of the present invention on the number of small capacity single cells.

FIG. 5 is a view showing characteristics of a maximum current that can be instantaneously flowed into an electric double layer capacitor 1B depending on the number of small capacity single cells.

The maximum current, which is allowed to instantaneously flow into the electric double layer capacitor only constructed of large capacity single cell 11 is, 50 A. As the number of the small capacity single cells 12 increases, as shown in FIG. 5, the maximum current allowed to instantaneously flow into the electric double layer capacitor increases.

In this way, by changing the number of the small capacity single cells 12, the maximum current to instantaneously flow can be adjusted. Further, by adjusting the maximum current to flow in the case of only large capacity single cell 11 to the current required for the equipment operating in a normal mode, and by selecting the number of the small capacity single cells 12 based on the current to flow instantaneously required for the equipment, the electric double layer capacitor having the optimum structure for the equipment can be provided.

Further, the maximum current, which is necessary to instantaneously flow the equipment, in many cases, is twice or more than the maximum current required for the equipment operating in a normal mode, so the number of the small capacity single cells 12 is preferably twice or more than the number of the large capacity single cells 11.

Third Embodiment

Figure 6:
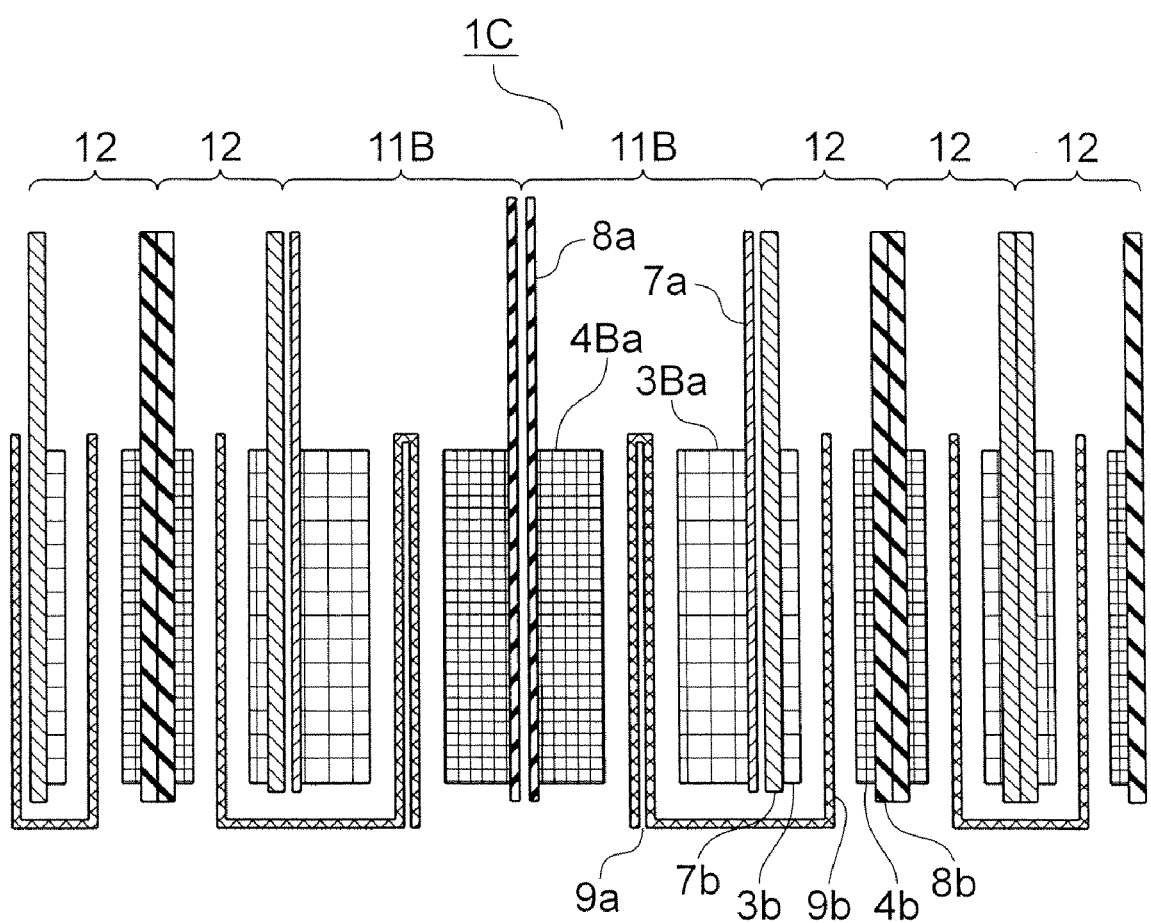
FIG. 6 is a sectional view showing a structure of an electric double layer capacitor according to a third embodiment of the present invention.

FIG. 6 is a sectional view showing a structure of an electric double layer capacitor according to a third embodiment of the present invention.

An electric double layer capacitor 1C according to the third embodiment of the present invention is different from the electric double layer capacitor 1 according to the first embodiment of the present invention in that the number of the large capacity single cells 11B and the thickness of the large capacity positive electrode layer 3Ba and the large capacity negative electrode layer 4Ba. However, the other components are similar to those of the first embodiment of the present invention, therefore, the description thereof is omitted while assigning the same reference symbols to the similar parts.

According to the third embodiment of the present invention, the thickness of the large capacity positive electrode layer 3Ba and the large capacity negative electrode layer 4Ba of each of the large capacity single cells 11B is 0.4 mm, and the number of the large capacity single cells 11B is two.

As shown in FIG. 6, the large capacity single cells 11B are placed at substantially the center in the layering direction, and the both sides thereof are sandwiched by the small capacity single cells 12.

In the electric double layer capacitor 1C according to the third embodiment of the present invention, the thickness of the large capacity positive electrode layer 3Ba and the large capacity negative electrode layer 4Ba of each of the large capacity single cells 11B is 0.4 mm, being thinner in comparison with the electric double layer capacitor 1 according to the first embodiment of the present invention. However, by increasing the number of the large capacity single cells 11B to double, the amount of electric power accumulated can be ensured.

In addition, according to the third embodiment of the present invention, the thickness of each of the thick electrode 3Ba and the large capacity negative electrode layer 4Ba of the large capacity single cells 11B is 0.4 mm. However, if the thickness is twice or more than the thickness of the small capacity positive electrode layer 3b and the small capacity negative electrode layer 4b of the small capacity single cells 12, it is not necessary to limit the thickness to 0.4 mm.

The large current flows through the small capacity single cells 12 during charging and discharging, so the heat is generated largely. It is known that the life time of the electric double layer capacitor decreases to one half every time temperature increases by 7 to 10° C. Therefore, in order to ensure the life time, it is necessary to decrease the temperature by immediately exhausting the generated heat to outside. In the case where the small capacity single cells 12 exist in the interior, it is necessary to perform the heat dissipation via the large capacity single cells 11. However, in the electric double layer capacitor 1C according to the third embodiment of the present invention, the small capacity single cells 12 are provided near the exterior case 13 through which heat dissipation can be performed with ease, so the temperature can be prevented from increasing by dissipating heat efficiently.

Fourth Embodiment

A structure of an electric double layer capacitor according to a fourth embodiment of the present invention is similar to that of the electric double layer capacitor 1C according to the third embodiment of the present invention, while an activated carbon forming the large capacity positive electrode layer 3Ba and the large capacity negative electrode layer 4Ba of each of the large capacity single cells 11B is only different, and the other components are similar. Therefore, the illustration and description thereof are omitted.

The activated carbon forming the large capacity positive electrode layer 3Ba and the large capacity negative electrode layer 4Ba of the large capacity single cells 11B according to the fourth embodiment of the present invention is the alkaline activated carbon having a large electrostatic capacity. On the other hand, an activated carbon forming the small capacity positive electrode layer 3b and the small capacity negative electrode layer 4b of the small capacity single cells 12 is the vapor activated carbon.

As described above, the large capacity positive electrode layer 3Ba and the large capacity negative electrode layer 4Ba of the large capacity single cells 11B is formed of the alkaline activated carbon, so the electrostatic capacity of the large capacity single cells 11B increases, and the amount of electric power to be accumulated increases.

Further, a thinner structure is also possible corresponding to the increase of electrostatic capacity, so a coating type electrode reduced in thickness, which is superior in mass-production, can be used.

Fifth Embodiment

Figure 7:
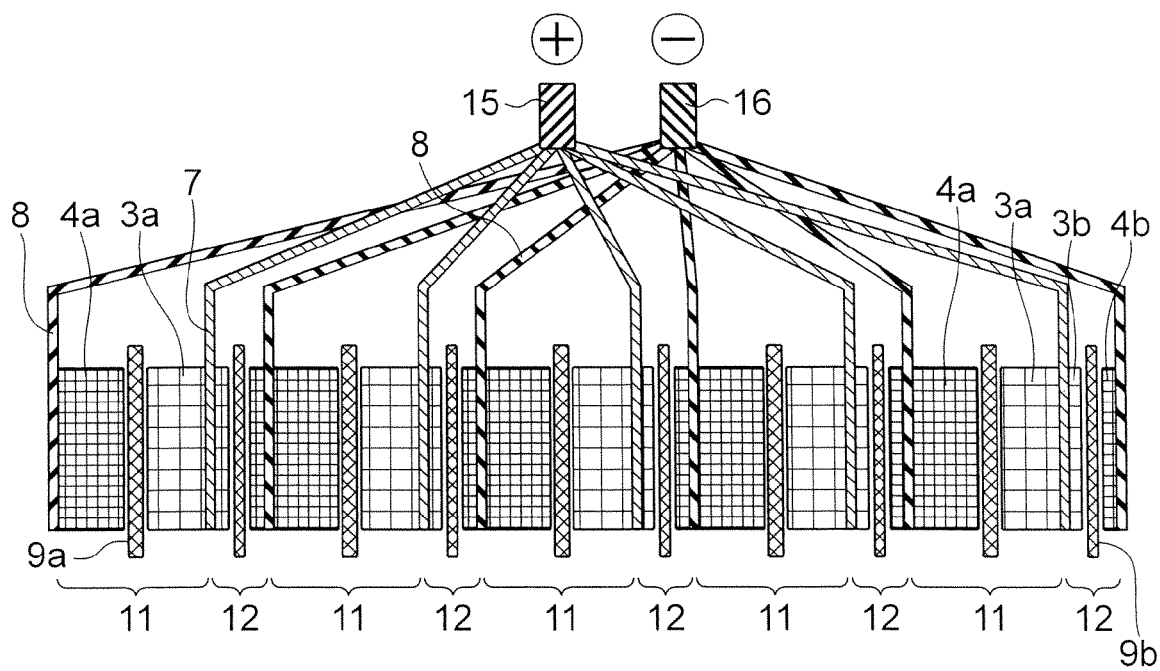
FIG. 7 is a schematic view showing a structure of electrodes of an electric double layer capacitor according to a fifth embodiment of the present invention.

FIG. 7 is a schematic view showing a structure of electrodes of an electric double layer capacitor according to a fifth embodiment of the present invention.

In the electric double layer capacitor according to the fifth embodiment of the present invention, large capacity single cells 11 of film type and small capacity single cells 12 of film type are alternately layered.

Each of the large capacity single cells 11 includes a large capacity positive electrode layer 3a formed on a front surface of a positive electrode current collector 7, a large capacity negative electrode layer 4a formed on a back surface of a negative electrode current collector 8, and a separator 9a interposed between the large capacity positive electrode layer 3a and the large capacity negative electrode layer 4a.

Further, each of the small capacity single cell 12 includes a small capacity positive electrode layer 3b formed on a back surface of the positive electrode current collector 7, a small capacity negative electrode layer 4b formed on a front surface of the negative electrode current collector 8, and a separator 9b interposed between the small capacity positive electrode layers 3b and the small capacity negative electrode layers 4b.

Further, the respective positive electrode current collectors 7 are connected to a positive electrode terminal 15 in parallel. Further, the respective negative electrode current collectors 8 are connected to a negative electrode terminal 16 in parallel.

The thickness of each of the large capacity positive electrode layers 3a and the large capacity negative electrode layers 4a is 400 μm, and the thickness of each of the small capacity positive electrode layers 3b and the small capacity negative electrode layers 4b is 100 μm.

The thickness of each of the positive electrode current collectors 7 and the negative electrode current collectors 8 is 30 μm, and the thickness of each of the separators 9a and 9b is 70 μm and 35 μm, respectively. The size of the front surface of each of the rectangular electrode layers 3a, 3b, 4a, and 4b is 10 cm by 10 cm.

Further, the positive electrode current collectors 7 and the positive electrode terminal 15, and the negative electrode current collectors 8 and the negative electrode terminal 16, are respectively connected by the ultra sonic connecting or the like.

Figure 8:
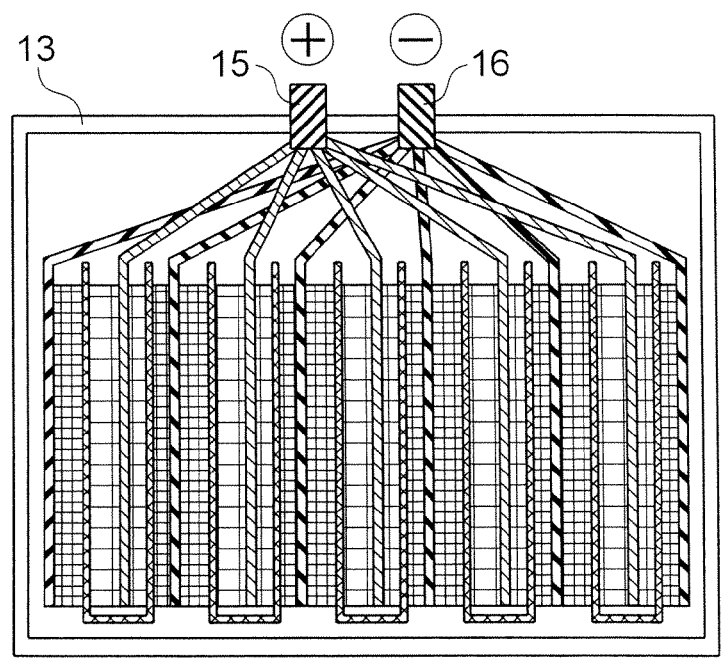
FIG. 8 is a longitudinal sectional view showing a state where the electric double layer capacitor according to the fifth embodiment of the present invention is received in an exterior case.

FIG. 8 is a sectional side view showing a structure of the electric double layer capacitor according to the fifth embodiment of the present invention.

The electric double layer capacitor according to the fifth embodiment of the present invention is formed by receiving the structural members of electrodes of FIG. 7 within the exterior case 13 that is impregnated with the electrolytic solution and is sealed.

Next, in order to evaluate the characteristics of the electric double layer capacitor according to the fifth embodiment of the present invention, an electric double layer capacitor of Example 1 is fabricated.

In order to compare to Example 1, concurrently, an electric double layer capacitor of each of Comparative Examples 1 to 3 is fabricated.

In addition, each volume of electrodes in the electric double layer capacitors of Example 1 and Comparative Examples 1 to 3 are similarly designed. Therefore, their electrostatic capacities during charging are approximately the same.

An electric double layer capacitor according to the fifth embodiment of the present invention, which is made as Example 1, has eight large capacity single cells 11 and eight small capacity single cells 12 which are alternatively layered. This electric double layer capacitor according to the fifth embodiment of the present invention is called a thick film hybrid capacitor in the description hereinafter.

Further, an electric double layer capacitor only constructed of ten large capacity single cells 11 is fabricated as Comparative Example 1. This electric double layer capacitor is called a 400 μm capacitor in the description hereinafter.

Further, an electric double layer capacitor only constructed of forty small capacity single cells 12 is fabricated as Comparative Example 2. This electric double layer capacitor is called a 100 μm capacitor in the description hereinafter.

Further, as Comparative Example 3, an electric double layer capacitor only constructed of eight large capacity single cells 11 and an electric double layer capacitor only constructed of eight small capacity single cells 12 are electrically connected in parallel via an external circuit. Those electric double layer capacitors thus connected are collectively called a parallel connecting capacitor in the description hereinafter.

Next, the characteristics of the internal resistances depending on the discharging time of the electric double layer capacitors fabricated in Example 1 and Comparative Examples 1 to 3 are evaluated.

The electric double layer capacitor is charged until its terminal voltage reaches 2.7 V. After completion of the charging, when the discharging with a 50 A current starts, the decreasing value of the terminal voltage, i.e., the voltage drop is measured in a short period of time immediately after the start of the discharging, and the measured value is converted to the internal resistance value.

Figure 9:
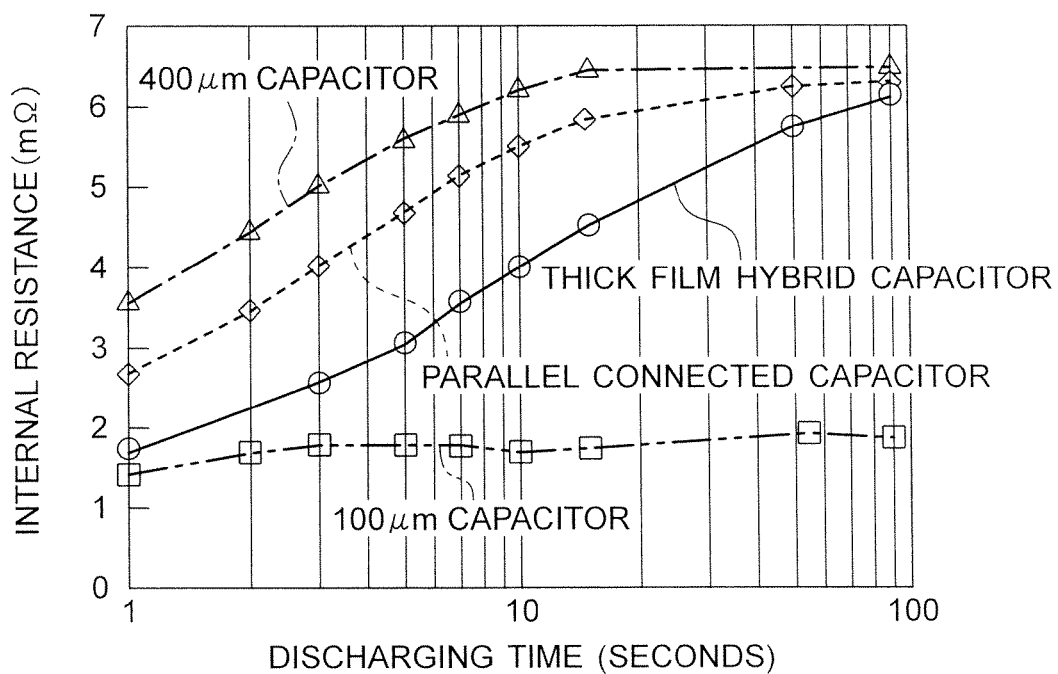
FIG. 9 is a graph showing a dependency of an internal resistance on discharging time of the electric double layer capacitor according to the fifth embodiment and Comparative Examples 1 to 3 of the present invention.

Further, FIG. 9 shows results of determining the change of internal resistance with respect to changing the discharging time.

As can be seen from the results of FIG. 9, the internal resistance of the 100 μm capacitor (Comparative Example 2) is small irrespective of discharging time, that is, the internal resistance shows approximately constant value from 1 to 100 seconds after the start of the discharging.

On the other hand, the internal resistance value of the 400 μm capacitor (Comparative Example 1) 1 second after the start of the discharging is about three times larger than that of the internal resistance value of the 100 μm capacitor (Comparative Example 2), and the value from 10 to 100 seconds after the start of the discharging is about five times larger. This is because the internal resistance becomes large due to the large thickness of the electrodes.

In addition, the internal resistance value of the parallel connecting capacitor (Comparative Example 3) is smaller than the internal resistance value of the 400 μm capacitor (Comparative Example 1). That is, the effect of the parallel connection of the capacitors is confirmed.

On the other hand, the internal resistance value of the thick film hybrid capacitor (Example 1) is still smaller than the internal resistance value of the parallel connecting capacitor (Comparative Example 3). Particularly, the internal resistance value 1 second after the start of discharging shows a value close to that of the 100 μm capacitor (Comparative Example 2).

The internal resistance value of the thick film hybrid capacitor (Example 1) gradually increases with the discharging time elapses. The internal resistance value increases to the similar value of that of the parallel connecting capacitor 100 seconds after the start of the discharging.

Next, the charge and discharge rate depending on the discharging time of each of the electric double layer capacitors of Example 1 and Comparative Examples 1 to 3 is evaluated.

The charge and discharge rate is obtained by measuring the charging current when charging the terminal voltage from 0 to 2.7 V, and the discharging current when discharging so that the discharged inrush current becomes 50 A.

Figure 10:
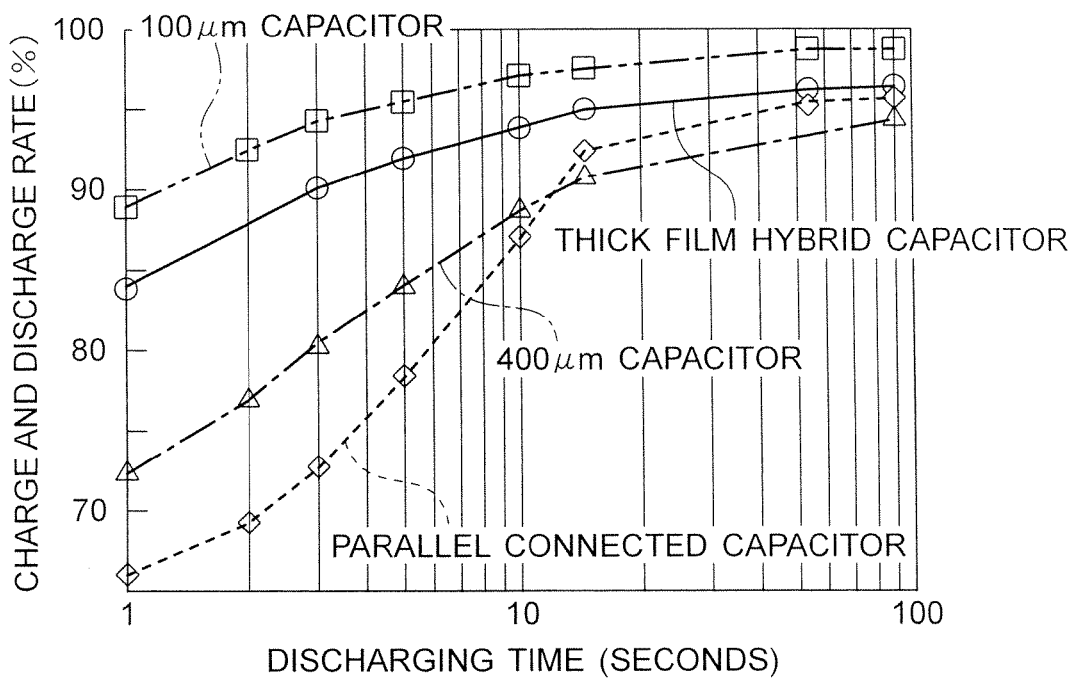
FIG. 10 is a graph showing a charge and discharge efficiency depending on the discharging time of the electric double layer capacitor according to the fifth embodiment and Comparative Examples 1 to 3 of the present invention.

FIG. 10 shows results of determining the charge and discharge rates by changing the discharging time.

The charge and discharge rate of the 400 μm capacitor (Comparative Example 1) is considerably lower than that of the 100 μm capacitor (Comparative Example 2) 1 second after the start of the discharging, this is because the internal resister of the 400 μm capacitor (Comparative Example 1) is larger than that of the 100 μm capacitor.

However, even though the internal resister of the parallel connecting capacitor (Comparative Example 3) 1 second after the start of the discharging is smaller than that of the 400 μm capacitor (Comparative Example 1), the charge and discharge rate of the parallel connecting capacitor is considerably lower than that of the 400 μm capacitor (Comparative Example 1).

On the other hand, the charge and discharge rate of the thick film hybrid capacitor (Example 1) is considerably higher than that of the 400 μm capacitor (Comparative Example 1). The charge and discharge rate close to that of 100 μm capacitor (Comparative Example 2) is obtained.

Figure 11A:
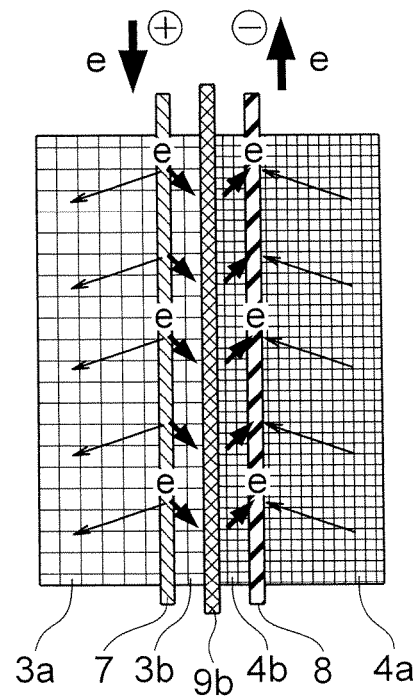
FIGS. 11A and 11B are schematic sectional views each showing a state of movement of electrons between a large capacity single cell and a small capacity single cell in the electric double layer capacitor according to the fifth embodiment of the present invention.
Figure 11B:
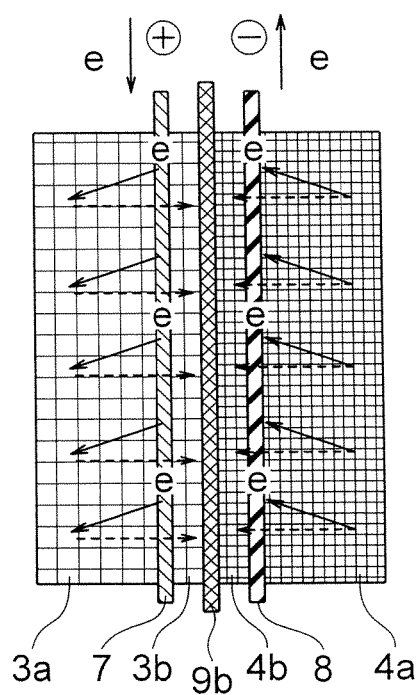

FIGS. 11A and 11B are schematic sectional views showing a state of movement of electrons between the large capacity single cell 11 and the small capacity single cell 12 of the thick film hybrid capacitor (Embodiment 5 (Example 1).

Next, described is the reason why the charge and discharge rate of the electric double layer capacitor according to the fifth embodiment of the present invention is high.

Note that, since the positive electrode layer and the negative electrode layer are symmetry and the direction of movement of electrons at the positive electrode layer is opposite to that of the negative electrode layer, the movement of electrons at the negative electrode layer is only described herein.

When the positive electrode terminal 15 and the negative electrode terminal 16 of the electric double layer capacitor, in which the charge is completed, are connected via the resister, for example, the discharge starts.

The discharged electrons are accumulated in the electric double layer formed at the interface between the electrolytic solution and each of the large capacity negative electrode layer 4a and small capacity negative electrode layer 4b.

Since the resistance value of the small capacity negative electrode layer 4b up to the negative electrode current collector 8 is smaller than the resistance value of the large capacity negative electrode layer 4a up to the negative electrode current collector 8, the current (represented by the thick line arrows shown in FIG. 11A) flowing from the small capacity negative electrode layer 4b to the negative electrode current collector 8 is larger than the current (represented by the thin line arrows shown in FIG. 11A) flowing from the large capacity negative electrode layer 4a to the negative electrode current collector 8.

For example, the resistance value of the small capacity negative electrode layer 4b of 100 μm is about one third of the resistance value of the large capacity negative electrode layer 4a of 400 μm, so the small capacity negative electrode layer 4b can discharge the current three times larger than the large capacity negative electrode layer 4a.

Then, the electrons collected in the negative electrode current collector 8 flow toward the negative electrode terminal 16.

However, the electrons accumulated in the small capacity negative electrode layer 4b is about one fourth of the electrons accumulated in the large capacity negative electrode layer 4a, so a potential difference occurs between the large capacity negative electrode layer 4a and the small capacity negative electrode layer 4b, and the electrons flow from the large capacity negative electrode layer 4a to the small capacity negative electrode layer 4b (as represented by the dotted arrows of FIG. 11B) so as to reduce the potential difference.

At this time, since the electrons flow from the large capacity negative electrode layer 4a to the small capacity negative electrode layer 4b via the negative electrode current collector 8, the loss is small because it is only produced in the negative electrode current collector 8 which is thin and has a large area.

When the potential difference is reduced because the electrons flow from the large capacity negative electrode layer 4a to the small capacity negative electrode layer 4b, the electrons again flow from the small capacity negative electrode layer 4b to the negative electrode current collector 8, and a potential difference again occurs, so the electrons flow from the large capacity negative electrode layer 4a to the small capacity negative electrode layer 4b.

In this way, concerning the small capacity negative electrode layer 4b, the discharge from the small capacity negative electrode layer 4b to the negative electrode current collector 8 and the charge from the large capacity negative electrode layer 4a to the small capacity negative electrode layer 4b are repeated. As the whole electric double layer capacitor, the discharge progresses.

In this way, the small capacity negative electrode layer 4b and the large capacity negative electrode layer 4a are formed on the front and back surfaces of the negative electrode current collector 8, respectively. The resistance between the small capacity negative electrode layer 4b and the negative electrode current collector 8 is small, so it is possible to instantaneously take the electrons accumulated in the small capacity negative electrode layer 4b as a large current.

Further, the electrons are supplied from the large capacity negative electrode layer 4a to the small capacity negative electrode layer 4b from which the current is instantaneously discharged, so the current can be taken for a long period of time.

Further, when the electrons are supplied from the large capacity negative electrode layer 4a to the small capacity negative electrode layer 4b, the electrons flow toward the direction of thickness of the negative electrode current collector 8 having a large area, so the loss produced with charging from the large capacity negative electrode layer 4a to the small capacity negative electrode layer 4b is small.

Further, during discharging, the direction of the flowing electrons through the negative electrode current collector 8 is one direction, that is from the negative electrode current collector 8 to the negative electrode terminal 16, so all the electrons accumulated in the large capacity negative electrode layer 4a and the small capacity negative electrode layer 4b can be taken.

Figure 12A:
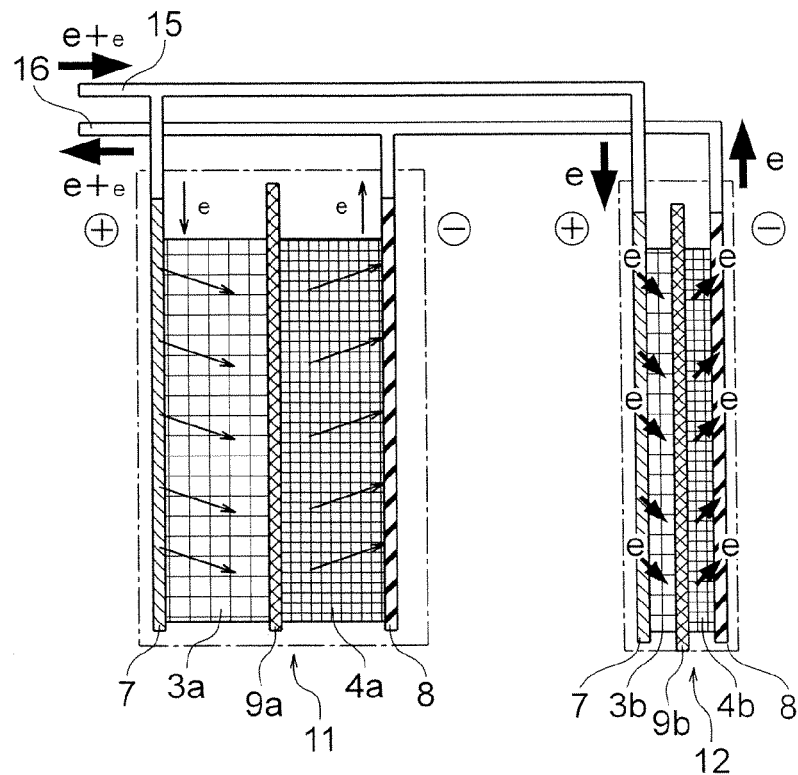
FIGS. 12A and 12B are schematic sectional views each showing a state of movement of electrons between a large capacity single cell and a small capacity single cell of parallel connecting capacitors of Comparative Example 3 of the present invention.
Figure 12B:
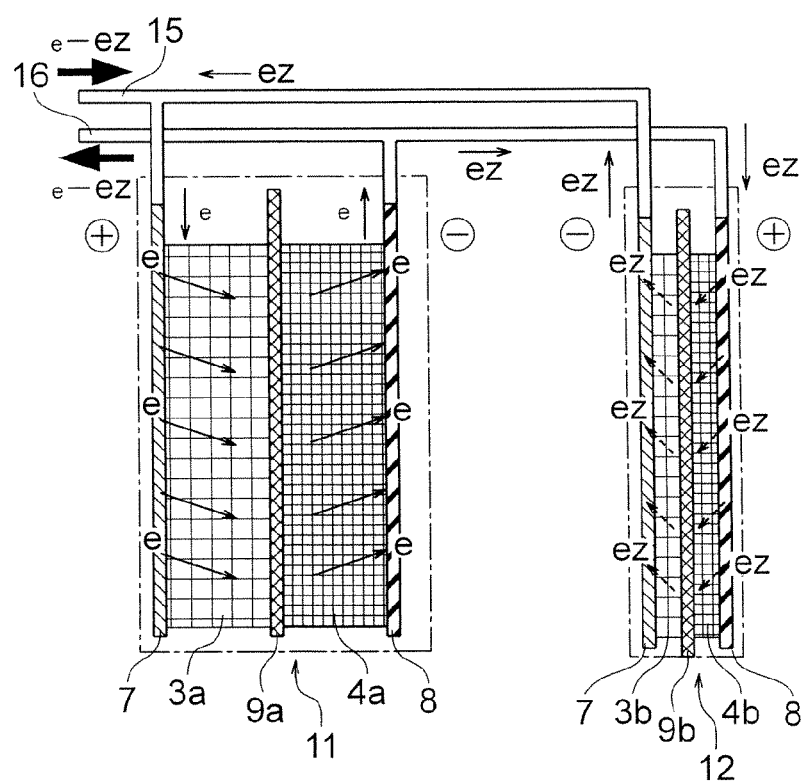

FIGS. 12A and 12B are schematic views showing a state of movement of electrons immediately after the start of the discharging of the parallel connecting electric double layer capacitor (Comparative Example 3).

In FIGS. 12A and 12B, the electric double layer capacitor having one large capacity single cell 11 with electrodes of 400 μm in thickness and the electric double layer capacitor having one small capacity single cell 12 with electrodes of 100 μm in thickness are typically shown.

Next, the flowing of electrons during the discharging of the parallel connected capacitor in Comparative Example 3 is described, and then, the difference between the parallel connected capacitor and the electric double layer capacitor according to the fifth embodiment of the present invention is clarified.

In addition, since the positive electrode layer and the negative electrode layer are symmetry and the direction of movement of electrons at the positive electrode layer is opposite to that at the negative electrode layer, the movement of electrons at the negative electrode layer is only described herein.

When the positive electrode terminal 15 and the negative electrode terminal 16 of the parallel connected capacitor in which the charge is completed are connected via the resister, for example, the discharge starts.

The discharged electrons are accumulated in the electric double layer formed at the interface between the electrolytic solution and each of the large capacity negative electrode layer 4a of the large capacity single cell 11 and the electrolytic solution of small capacity negative electrode layer 4b of the small capacity single cell 12.

The resistance value of the small capacity negative electrode layer 4b up to the negative electrode current collector 8 is smaller than the resistance value of the large capacity negative electrode layer 4a up to the negative electrode current collector 8, so the current (as represented by the thick line arrows of FIG. 12A) flowing from the small capacity negative electrode layer 4b to the negative electrode current collector 8 is larger than the current (as represented by the thin line arrows of FIG. 12A) flowing from the large capacity negative electrode layer 4a to the negative electrode current collector 8.

For example, the resistance value of the small capacity negative electrode layer 4b of 100 μm is about one third of the resistance value of the large capacity negative electrode layer 4a of 400 μm, so the small capacity negative electrode layer 4b can discharge the current three times larger than the large capacity negative electrode layer 4a.

Note that, the electrons flowing from the small capacity negative electrode layer 4b and large capacity negative electrode layer 4a to the negative electrode current collector 8 flow toward outside via each negative electrode terminal 16.

However, the electrons accumulated in the small capacity single cell 12 is about one fourth of the electrons accumulated in the large capacity single cell 11, so a potential difference occurs between the large capacity single cell 11 and the small capacity single cell 12, and the electrons flow from the large capacity single cell 11 to the small capacity single cell 12 (as represented by the dotted arrows of FIG. 12B) so as to reduce the potential difference.

At this time, the electrons flow from the large capacity negative electrode layer 4a to the small capacity negative electrode layer 4b via the negative electrode current collector 8, the negative electrode terminal 16, wirings, the negative electrode terminal 16, and the negative electrode current collector 8, so the large loss occurs because the electrons flow through the two negative electrode terminals 16 and the wirings.

Further, when the electrons flow from the small capacity single cell 12 to the outside, and when the electrons flow from the large capacity single cell 11 to the small capacity single cell 12, vibration occurs because the flowing direction of the electrons turns around.

When the potential difference is reduced because the electrons flow from the large capacity negative electrode layer 4a to the small capacity negative electrode layer 4b, the electrons flow from the small capacity negative electrode layer 4b to the negative electrode current collector 8, and a potential difference again occurs, so the electrons flow from the large capacity negative electrode layer 4a to the small capacity negative electrode layer 4b.

In this way, when the large capacity single cell 11 and the small capacity single cell 12 are respectively provided to each electric double layer capacitor and connected via the external circuit, in spite of the small internal resistance, the charge and discharge rate becomes low due to the loss produced by the current flowing through the terminals and wirings.

Further, when the flowing direction of the current through the current collecting foils and wirings turns around, the current flowing therethrough is the component that can not be taken to the outside, so the energy consumed in the internal resistance is the current component that cannot be taken to the external load.

Further, the movement of the current appears as the vibration of the discharging current, so the current being taken also becomes unstable.

On the other hand, as in the electric double layer capacitor according to the fifth embodiment of the present invention, by respectively forming the large capacity negative electrode layer 4a and the small capacity negative electrode layer 4b on the front and back surfaces of the negative electrode current collector 8, during charging from the large capacity negative electrode layer 4a to the small capacity negative electrode layer 4b, the electrons only flow to the thickness direction of the negative electrode current collector 8, so in spite of repeating recharge in the small capacity single cell 12 of 100 µm, little loss of energy to be taken to the outside occurs.

Figure 13A:
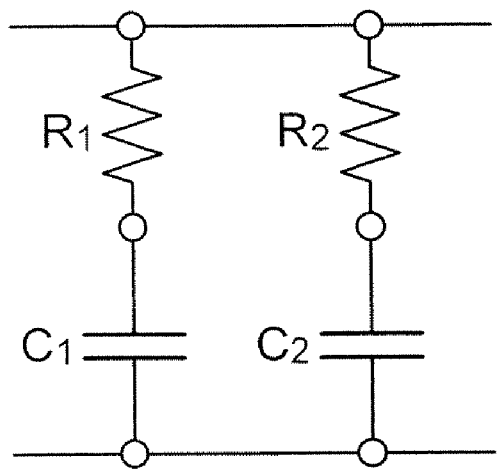
FIGS. 13A and 13B are equivalent circuit diagrams of the electric double layer capacitors according to Comparative Example 3 and the fifth embodiment of the present invention.
Figure 13B:
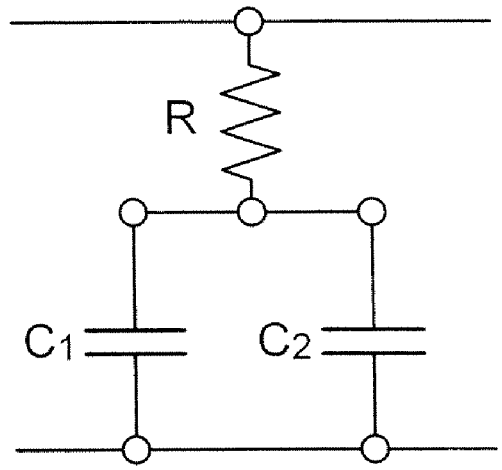

FIGS. 13A and 13B are equivalent circuit diagrams of the electric double layer capacitor of Comparative Example 3 and the electric double layer capacitor of the fifth embodiment of the present invention, respectively.

FIG. 13A is the equivalent circuit diagram of the parallel connected capacitor (Comparative Example 3).

FIG. 13B is the equivalent circuit diagram of the electric double layer capacitor according to the fifth embodiment of the present invention.

Here, reference symbol $C_1$ denotes the capacitor with large electrostatic capacity, reference symbol $C_2$ denotes the capacitor with small electrostatic capacity, reference symbol $R_1$ denotes the sum of the electric resistance of the current collector for the case where a current flows in the plane thereof with the large electrostatic capacity and the electric resistance of the wirings, reference symbol $R_2$ denotes the sum of the electric resistance of the current collector in the case where a current flows in the plane thereof with the small electrostatic capacity and the electric resistance of the wirings.

Further, reference symbol R denotes the sum of the electric resistance of the current collector of the first embodiment of the present invention in the case where a current flows in the plane thereof and the electric resistance of the wirings.

In Comparative Example 3, when the current is charged from the capacitor with the large electrostatic capacity to the capacitor with the small electrostatic capacity, the current flows through the electric resistance $R_1$ and the electric resistance $R_2$, so the large Joule heat generates. However, in the fifth embodiment of the present invention, when the current is charged from the capacitor with the large electrostatic capacity to the capacitor with the small electrostatic capacity, the current does not flow through the electric resistance R, so the energy loss is extremely small.

An instantaneous current which has several times larger maximum value than that of a steady state current generates when driving a vast majority of equipment such as motors. In order to handle the instantaneous current, in a case of using the conventional electric double layer, it is required that the number of cells as many as the number of cells which can flow the whole amount of a current by using single cells of small capacity having thin electrodes that can flow the maximum value of the instantaneous current.

The instantaneous current should be flowed instantaneously. However, considering that the instantaneous current rapidly decreases soon after and settles for the steady state current, the structure only using single cells of small capacity having thin electrodes results in over-specification, because the maximum current to be handled is many times larger than the maximum current required for the steady state current.

On the other hand, the electric double layer capacitor according to the first embodiment of the present invention can attain lower cost by reducing the total number of the cell potions, with attaining the instantaneous current required.

Further, the parallel connected capacitor in which the electric double layer capacitor only constructed of the single cells of small capacity and the electric double layer capacitor only constructed of the single cells of large capacity are connected via the external circuit in parallel results in high in cost, because two exterior cases are required.

On the other hand, the electric double layer capacitor according to the fifth embodiment of the present invention can be significantly low in cost by alternately arranging the single cells of small capacity and the single cells of large capacity within the same exterior case.

In addition, in the fifth embodiment of the present invention, the thickness of the large capacity negative electrode layer 4a is four times thicker than the thickness of the small capacity negative electrode layer 4b, and the thickness of the large capacity positive electrode layer 3a is four times thicker than the thickness of the small capacity positive electrode layer 3b. It is at least required that the thickness of the large capacity negative electrode layer 4a is two times thicker than the thickness of the small capacity negative electrode layer 4b, and the thickness of the large capacity positive electrode layer 3a is two times thicker than the thickness of the small capacity positive electrode layer 3b. This is because the thickness of the small capacity negative electrode layer 4b must be thin so as to satisfy the maximum value of the instantaneous current. If the large capacity negative electrode layer 4a with thickness less than two times than the thickness of the small capacity negative electrode layer 4b is used, the amount of energy which can be accumulated in total in the electric double layer capacitor is little.

Further, in the fifth embodiment of the present invention, the thick film electrode layer and the thin film electrode layer each having a different electrostatic capacity and an internal resistance of the electrode by using the same activated carbon but by changing thickness. Alternatively, the thick film electrode layer and the thin film electrode layer may be formed by using the activated carbon having a large electrostatic capacity and an internal resistance and the activated carbon having a small electrostatic capacity and internal resistance, respectively.

In this case, the thickness of the large capacity negative electrode layer may be at least two times thicker than the thickness of the small capacity negative electrode layer, and the thickness of the large capacity positive electrode layer may be at least two times thicker than the thickness of the small capacity positive electrode layer, by converting the thickness to equivalent electrostatic capacity.

As Comparative Example 4, an electric double layer capacitor is fabricated, in which, in contrast to the electric double layer capacitor of Example 1, the separator 9b having a thickness of 35 μm, which is the same thickness as that of the separator of the small capacity single cell 12, is used as the separator for the large capacity single cell 11 instead of the separator 9a, and, as in Example 1, the eight large capacity single cells 11 and the eight small capacity single cells 12 are alternately layered.

Then, 50,000 times of charging and discharging tests are performed at 60° C. (charge voltage: 2.7 V, discharge voltage: 1.5 V). As a result, a factor of maintaining the electrostatic capacity (factor indicating how extent the initial electrostatic capacity is maintained) is 80% in Comparative Example 4, which is 5% down from Example 1 of 85%.

As described above, even in the case where the large capacity single cells 11 and the small capacity single cells 12 are layered alternately in the same numbers, by increasing the thickness of the separator 9 of the large capacity single cell 11, the replenishment against the movement of the electrolyte at the time of charging and discharging may be improved, and the cycle life is improved, which substantiates the effects of the present invention.

Sixth Embodiment

An electric double layer capacitor according to a sixth embodiment of the present invention is different from the electric double layer capacitor according to the fifth embodiment of the present invention in the thickness of the large capacity positive electrode layer 3a and the thickness of the small capacity positive electrode layer 3b. However, the other components are similar to those of the fifth embodiment of the present invention, therefore, the illustration and description are omitted while assigning the same reference symbols to the similar parts.

The thickness of the large capacity positive electrode layer 3a and the thickness of the small capacity positive electrode layer 3b according to the sixth embodiment of the present invention are 300 μm and 80 μm, respectively. That is, the large capacity positive electrode layer 3a having the thickness of 300 μm is 100 μm thinner than the large capacity negative electrode layer 4a having the thickness of 400 μm, facing with each other via the separator 9a. Further, the small capacity positive electrode layer 3b having the thickness of 80 μm is 20 μm thinner than the small capacity negative electrode layer 4b having the thickness of 100 μm, facing with each other via the separator 9b.

As the electric double layer capacitor according to the sixth embodiment of the present invention, the electric double layer capacitor according to Example 2 is fabricated by alternately laying, as in Example 1, the eight large capacity single cells 11 and the eight small capacity single cells 12.

Then, the electrostatic capacities, the internal resistances, and the charge and discharge rates of the electric double layer capacitors of Example 1 and Example 2 are measured and compared.

As a result, the electric double layer capacitor of Example 2, even though having the small volume of the total electrodes, has approximately the same electrostatic capacity as the electric double layer capacitor of Example 1, has the smaller internal resistance than the electric double layer capacitor of Example 1, and has approximately the same value of the charge and discharge rate as the electric double layer capacitor of Example 1.

As described above, the negative electrode layer is made thicker than the thickness of the positive electrode layer and the capacity is made larger, with the result that the balance between the internal resistance and the polarization between the negative electrode layers and positive electrode layers in the negative electrode layer is improved, the electrostatic capacity increases, and the internal resistance is reduced.

Seventh Embodiment

Figure 14:
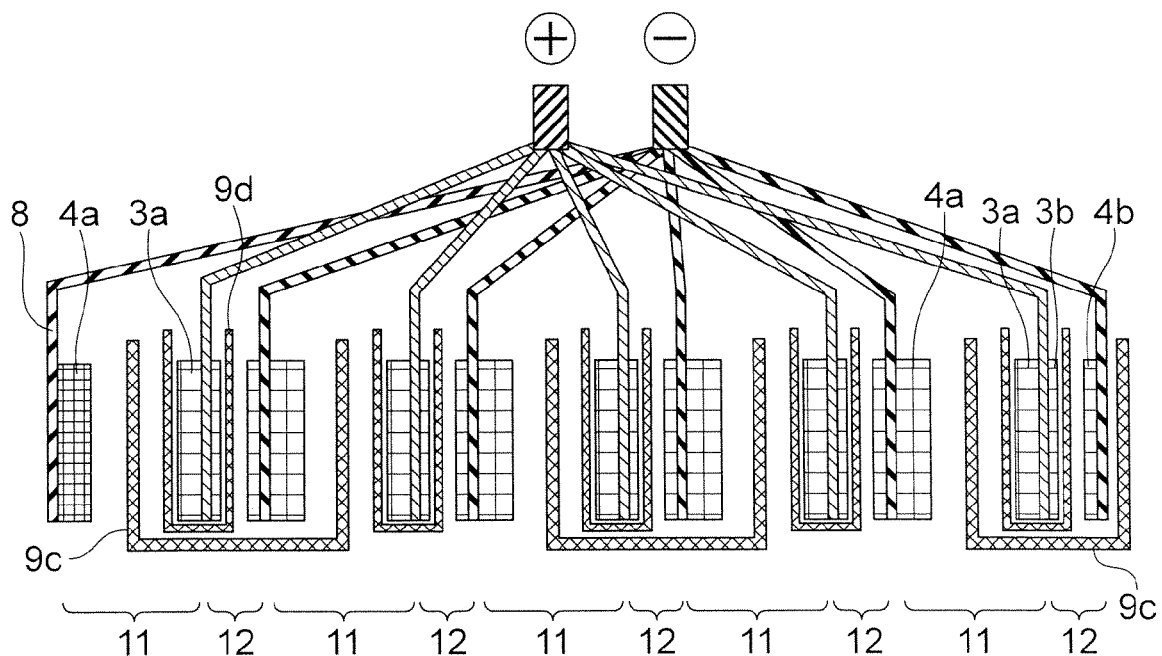
FIG. 14 is a schematic view showing a structure of electrodes of an electric double layer capacitor according to a seventh embodiment of the present invention.

FIG. 14 is a schematic view showing a structure of electrodes of an electric double layer capacitor according to a seventh embodiment of the present invention.

Basic structure of the electrodes of the electric double layer capacitor according to the seventh embodiment of the present invention is the same as that of the electrodes of the electric double layer capacitor of FIG. 7 according to the fifth embodiment of the present invention, and the large capacity single cells 11 and the small capacity single cells 12 are alternately layered.

The structure of the separators differs from that of FIG. 7. According to the structure shown in FIG. 14, separators 9c having large average pore diameters are provided for the large capacity negative electrode layers 4a, and separators 9d having a small average pore diameter are provided for the large capacity positive electrode layers 3a, the small capacity positive electrode layers 3b, and the small negative electrode layers 4b.

In the case where the separator has a large average pore diameter, the movement of the electrolyte solution is fast, and in the case where the separator having a large average pore diameter and the separator having a small average pore diameter face each other, the electrolyte solution is likely to be absorbed by the separator having a small average pore diameter.

In the case where, due to the repeated charging and discharging, the shortage of the electrolyte solution occurs for the separators 9d having a small average pore diameter, which face the large capacity positive electrode layers 3a, the electrolyte solution is replenished through the separators 9c having a large average pore diameter, which face the large capacity negative electrode layers 4a.

The shortage of the electrolyte solution due to the repeated charging and discharging is liable to occur in the large capacity positive electrode layers 3a. In particular, in the case where carbon particles such as Nanogate carbon™, which absorb much electrolyte solution due to expansion thereof when being charged, are used for the large capacity positive electrode layers 3a, the shortage of the electrolyte solution liable to occur.

The electrolyte solution is replenished through the separators 9c having a large average diameter to the separators 9d having a small average diameter, which face the large capacity positive electrode layers 3a. As a result, the degradation of the large capacity positive electrode layer 3a due to the shortage of the electrolyte solution is prevented from occurring.

In FIG. 14, the separators 9d having a small average diameter are arranged so as to enclose the large capacity positive electrode layers 3a and the small positive electrode layers 3b, which are formed on the front and back surfaces of the positive electrode current collectors 7. The separators 9c having a large average diameter are arranged so as to communicate the large capacity negative electrode layer 4a with another large capacity negative electrode layer 4a being adjacent.

By communicating between the electrode layers being adjacent through the separator, the movement of the electrolyte solution between the electrode layers being adjacent becomes possible, resulting in easily replenishing the shortage of the electrolyte solution when the charging and discharging is repeated, in particular the shortage of the electrolyte solution at the high temperature portion based on the temperature distribution in the electric double layer capacitor.

Next, as in Example 1 of the fifth embodiment of the present invention, 50,000 times of charging and discharging tests are performed at 60° C. (charge voltage: 2.7 V, discharge voltage: 1.5 V). As a result, a factor of maintaining the electrostatic capacity (factor indicating how extent the initial electrostatic capacity is maintained) is 89% in the seventh embodiment, which is 4% up from Example 1 in the fifth embodiment of 85%.

This result confirms the effect according to the seventh embodiment of the present invention.

Note that, in the above-mentioned seventh embodiment of the present invention, there is shown an example in which the separators 9d having a small average pore diameter face the large capacity positive electrode layers 3a, but not limited to the example case. The separators 9d may face the large capacity negative electrode layers 4a.

In addition, one each of the separators 9d having a small average pore diameter may face both of the large capacity positive electrode layers 3a and the large capacity negative electrode layers 4a, respectively, and the separator 9c having a large average pore diameter may be inserted between the two separators 9d. The same effect can be obtained in this case, too.

Note that, according to the first to seventh embodiments of the present invention, there is employed the method involving thickening the thickness of the electrode layers as means for enhancing the electrostatic capacity. However, in the case where Nanogate carbon™ or graphite-based carbon is used for the particles, it is possible to enhance the electrostatic capacity without thickening the thickness of the electrode layers, but rather by thinning the thickness of the electrode layers.

Further, as a method of enhancing the electrostatic capacity of the negative electrode layers, there is known a method involving using a lithium ion that intercalates into carbon. In this case, too, it is possible to enhance the electrostatic capacity without thickening the thickness of the electrode layers, but rather by thinning the thickness of the electrode layers.

Further, the electrostatic capacity may be enhanced by using measures other than the method involving thickening the thickness of the electrode layers.

Further, though not specifically described about the internal resistance, in the internal resistances of the electric double layer capacitor, ion diffusion resistance which generates at the time of loading and discharging an electrolyte solution to/from pores of the carbon particles is dominant except the electric resistance in the electric current collector, and the contribution of the electrode thickness and the separator thickness to the internal resistance is relatively small. Not only in the small capacity electrode layers but also in the large capacity electrode layers, the smaller the internal resistance the better. It is desirable to optimize the pore distribution in the electrode layers, the pore diameter of the carbon particles, and the size of the electrolyte solution in each of the positive electrode layers and the negative electrode layers.

Further, in the first to seventh embodiments of the present invention, there is employed an aluminum foil or a lead foil as the electric current collector. However, the surfaces thereof may be etched to provide irregularities thereon, or expanded metal or a metal foil with a multi hole structure may be used. The use of material having holes, such as the expanded metal or the metal foil with a multi hole structure, as the electric current collector facilitates the movement of the electrolyte solution between the front and back surfaces of the electric current collector, resulting in easily replenishing the shortage of the electrolyte solution when the charging and discharging is repeated, in particular the shortage of the electrolyte solution at the high temperature portion based on the temperature distribution in the electric double layer capacitor.

Further, in the first to seventh embodiments of the present invention, the positive electrode layers and the negative electrode layers having the same outer configurations are illustrated, the negative electrode layers may be constructed so as to have a larger size than that of the positive electrode layers. By enlarging the sizes of the negative electrode layers than that of the positive electrode layers, it is possible to obtain the effect of preventing the degradation of the positive electrode.

What is claimed is:

1. An electric double layer capacitor comprising a plurality of single cells including a positive electrode layer formed on a positive electrode current collector and a negative electrode layer formed on a negative electrode current collector, which are arranged so as to face each other with a porous separator provided therebetween, the plurality of the single cells being layered and disposed in an exterior case impregnated with an electrolytic solution, and being connected in parallel, wherein:

the positive electrode layers are classified into a large capacity positive electrode layer and a small capacity positive electrode layer whose electrostatic capacities are different from each other;

the negative electrode layers are classified into a large capacity negative electrode layer and a small capacity negative electrode layer whose electrostatic capacities are different from each other;

at least one of the single cells is a combination of the large capacity positive electrode layer and the large capacity negative electrode layer;

at least another one of the single cells is a combination of the small capacity positive electrode layer and the small capacity negative electrode layer;

a thickness of the separator disposed between the large capacity positive electrode layer and the large capacity negative electrode layer is thicker than the thickness of the separator disposed between the small capacity positive electrode layer and the small capacity negative electrode layer.

2. An electric double layer capacitor according to claim 1, wherein:
the electrostatic capacity of the large capacity positive electrode layer is two times or more of the electrostatic capacity of the small capacity positive electrode layer; and
the electrostatic capacity of the large capacity negative electrode layer is two times or more of the electrostatic capacity of the small capacity negative electrode layer.

3. An electric double layer capacitor according to claim 1, wherein:
the electrostatic capacity of the large capacity negative electrode layer exceeds the electrostatic capacity of the large capacity positive electrode layer; and
the electrostatic capacity of the small capacity negative electrode layer exceeds the electrostatic capacity of the small capacity positive electrode layer.

4. An electric double layer capacitor according to claim 1, wherein a number of the single cells including the small capacity positive electrode layer and the small capacity negative electrode layers is two times or more of a number the single cells including the large capacity positive electrode layers and the large capacity negative electrode layers.

5. An electric double layer capacitor according to claim 1 wherein:
the single cells including the large capacity positive electrode layers and the large capacity negative electrode layers are arranged one side with respect to a direction in which the single cells are layered; and
the single cells including the small capacity positive electrode layers and the small capacity negative electrode layers are arranged the other side with respect to the direction in which the single cells are layered.

6. An electric double layer capacitor according to claim 1 wherein:
the single cells including the large capacity positive electrode layers and the large capacity negative electrode layers are arranged at a center with respect to the direction in which the single cells are layered; and
the single cells including the small capacity positive electrode layers and the small capacity negative electrode layers are arranged on an outer side with respect to the direction in which the single cells are layered.

7. An electric double layer capacitor according to claim 1 wherein:
the single cells including the large capacity positive electrode layers and the large capacity negative electrode layers and the single cells including the small capacity positive electrode layers and the small capacity negative electrode layers are arranged alternately with respect to the direction in which the single cells are layered.

8. An electric double layer capacitor according to claim 1 wherein thicknesses of the electrode layers of the large capacity positive electrode layers and the large capacity negative electrode layers are thicker than the thicknesses of the electrode layers of the small capacity positive electrode layers and the small capacity negative electrode layers.

9. An electric double layer capacitor according to claim 1, wherein an electrostatic capacity of a carbon particle as a main component of the large capacity positive electrode layers and the large capacity negative electrode layers is larger than an electrostatic capacity of a carbon particle as a main component of the small capacity positive electrode layers and the small capacity negative electrode layers.

10. An electric double layer capacitor according to claim 1, wherein thicknesses of the positive electrode current collector and the negative electrode current collector, on which the small capacity positive electrode layers and the small capacity negative electrode layers are respectively formed, are thicker than thicknesses of the positive electrode current collector and the negative electrode current collector on which large capacity positive electrode layers and the large capacity negative electrode layers are respectively formed.

11. An electric double layer capacitor according claim 1, further comprising:
a plurality of positive electric current collectors each including the large capacity positive electrode layer and the small capacity positive electrode layer formed on a front side and a back side thereof;
a plurality of negative electric current collectors each including the large capacity negative electrode layer and the small capacity negative electrode layer formed on a front side and a back side thereof;
a plurality of separators each being disposed between the large capacity positive electrode layer and the large capacity negative electrode layer, and between the small capacity positive electrode layer and the small capacity negative electrode layer, wherein:
the plurality of positive electric current collectors and the plurality of negative electric current collectors are alternately arranged;
the plurality of positive electric current collectors are electrically connected in parallel with each other; and
the plurality of negative electric current collectors are electrically connected in parallel with each other.

12. An electric double layer capacitor according to claim 1, wherein the large capacity electrode layers include a separator having a larger average pore diameter than that of a separator of the small capacity electrode layers.

* * * * *